Nov. 23, 1926.

M. O. HANSBERGER 1,607,620

REMOVING TOOL FOR MILK BOTTLE CAPS

Filed April 17, 1925

INVENTOR.
Mary O. Hansberger
BY
ATTORNEY.

Patented Nov. 23, 1926.

1,607,620

UNITED STATES PATENT OFFICE.

MARY O. HANSBERGER, OF KANSAS CITY, MISSOURI.

REMOVING TOOL FOR MILK-BOTTLE CAPS.

Application filed April 17, 1925. Serial No. 23,818.

This invention relates to tools adapted to remove milk bottle caps of the disk-shaped, countersunk, paste board type, now in common use.

The primary object of this invention is the provision of a removing tool for milk bottle caps that will not force the cap into the bottle as it removes the same.

A further object of the present invention is to provide a household implement of the above-mentioned character that will be easy to manipulate, will remove a milk bottle cap without agitating the cream at the top of the bottle and will not force the cap beyond the shoulders of the bottle neck.

An even further object of this invention is the provision of a removing tool for milk bottle caps which is particularly constructed and designed to fit, and to be used with, the ordinary milk bottle now in universal use.

A still further object of the invention is the contemplation of a removing tool that will not break the bottle cap as it is forced therethrough and will preclude the same from bending.

The preferred way of constructing the present invention is illustrated in the accompanying drawing, wherein.

With particular reference to the novel features of construction and the use of the tool, the preferred form is shown in the accompanying drawing, and like parts are designated by like reference characters throughout the several views.

The tool may be made of any suitable metal, galvanized to prevent rusting, and stamped or cast in a single piece to present a handle 6 with a hanging eye 7 adjacent one end. Handle 6 may be flat, wider at the end wherein hanging eye 7 is punched, and tapered to form a pleasing shape adapted to fit the hand of the user.

The head 8 should be cresent shaped and disposed in a plane spaced from the plane of handle 6 by a connecting portion 9 which rigidly joins the convex edge of head 8 to the narrower end of handle 6 and spaces head 8 and handle 6 a distance apart substantially equal to the distance between cap C and the top edge of bottlet B.

Figure 1:
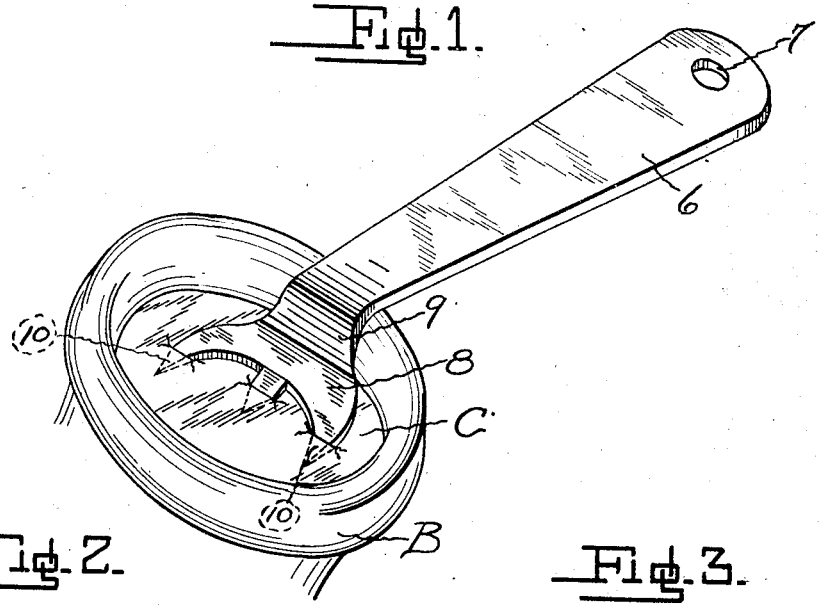
Figure 1 is a perspective view of the milk bottle cap removing tool in the operative position.
Figure 2:
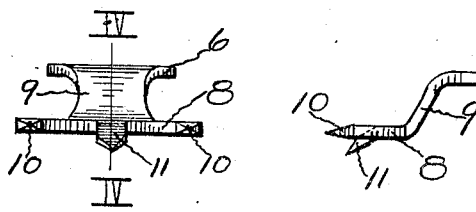
Fig. 2 is an end view of the tool.
Figure 3:
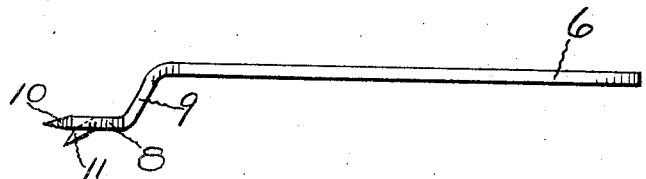
Fig. 3 is a side elevation of the same showing the downturned intermediate spur.

Cap engaging spurs 10 are formed at each point of the cresent shaped head 8, and extend outwardly in the same plane therewith as shown in Fig. 3. An intermediate spur 11, extending downwardly and outwardly from the concave arcuate edge of head 8, terminates at a point behind and below a line joining spurs 10.

Figure 4:
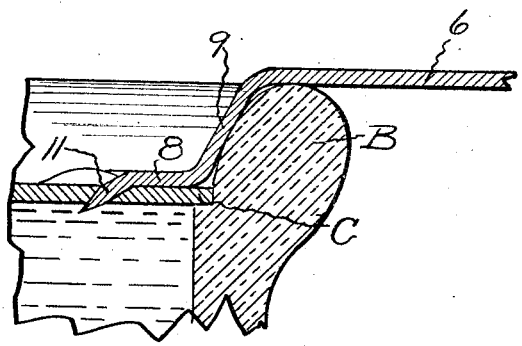
Fig. 4 is an enlarged fragmentary detail section of the tool taken on line IV—IV of Fig. 2 and showing the same in position for removing a milk bottle cap.
Figure 5:
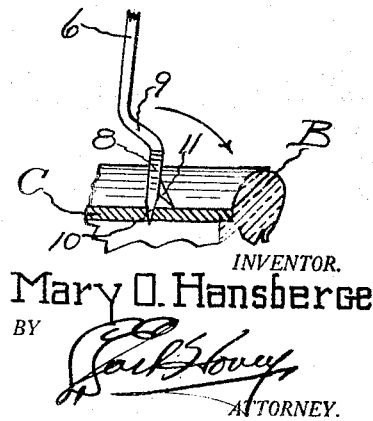
Fig. 5 is another fragmentary view of the tool, showing its position when the bottle cap is first engaged.

From the drawing, it will be evident that the tool should be inserted by holding the same nearly vertical, as shown in Fig. 5, piercing cap C with spurs 10, then drawing the handle 6 in the direction of the arrow to bear upon the top edge of bottle B as illustrated in Fig. 4. This movement forces intermediate spur 11 through cap C, permits portion 9 to engage the inner periphery of the neck of bottle B, which positively seats all three spurs, and allows the cap to be lifted by exerting a downward force on handle 6. When this tool is used, the extremely sharp spurs grip a large portion of cap C which keeps it from collapsing or breaking and plunging into the cream contained in bottle B. The cap, in its entirety, is lifted practically straight up and off of annular shoulder 12, and no cream is lost, no foreign particles introduced therein and no great amount of effort is brought into play during the entire operation.

Having thus described the invention, what is claimed is:

1. A cap remover of the kind described comprising a tapered handle, a crescent shaped head disposed in a plane parallel to the plane of said handle and supported in spaced relation thereto by a connecting portion extending downwardly at an angle from the narrow end of said handle, said crescent having its points spurred and disposed on a line extending at right angles to and below the longitudinal center of said handle and an intermediate spur projecting from the concave edge of said crescent shaped head and angled downwardly from its line of connection.

2. A tool for removing milk bottle caps or the like, comprising a handle having a crescent shaped head, spurs formed at the points of said crescent shaped head and a downwardly and outwardly projecting spur carried between arcuate, concave edges of said crescent intermediate the points thereof.

3. A tool for removing milk bottle caps or the like, comprising a handle having a crescent shaped head disposed on a plane spaced below the plane of said handle, spurs extending outwardly in the plane of said head, formed at the points of said crescent shaped head and a spur carried by the arcuate edge of said head intermediate the points thereof, said intermediate spur being angled downwardly out of the plane of said spurs formed at the points of said head.

In testimony whereof I hereunto affix my signature this 14th day of April, 1925.

MARY O. HANSBERGER.